United States Patent
Trapp et al.

(10) Patent No.: US 11,042,348 B2
(45) Date of Patent: Jun. 22, 2021

(54) AUDIO CONTROL IN VEHICLES

(71) Applicant: Bayerische Motoren Werke Aktiengesellschaft, Munich (DE)

(72) Inventors: Hannes Trapp, Munich (DE); Mario Urbina Cazenave, Pfaffenhofen an der Ilm (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 127 days.

(21) Appl. No.: 15/698,808

(22) Filed: Sep. 8, 2017

(65) Prior Publication Data
US 2017/0371618 A1 Dec. 28, 2017

Related U.S. Application Data

(63) Continuation of application No. PCT/EP2016/053775, filed on Feb. 23, 2016.

(30) Foreign Application Priority Data

Mar. 10, 2015 (DE) ...................... 10 2015 204 203.0

(51) Int. Cl.
| | |
|---|---|
| *G06F 3/16* | (2006.01) |
| *H04R 5/04* | (2006.01) |
| *G06F 3/0481* | (2013.01) |
| *G06F 3/0482* | (2013.01) |
| *G06F 3/0488* | (2013.01) |

(52) U.S. Cl.
CPC ............ *G06F 3/165* (2013.01); *G06F 3/0482* (2013.01); *G06F 3/0488* (2013.01);
(Continued)

(58) Field of Classification Search
CPC ..... B60K 35/00; G06F 3/165; G06F 3/04817; G06F 3/0482; G06F 3/0488; H04R 5/04; H04R 2499/13
See application file for complete search history.

(56) References Cited

U.S. PATENT DOCUMENTS 8,190,438 B1 * 5/2012 Nelissen ................. G10L 21/00
  381/85
8,583,292 B2 * 11/2013 Preston ................. H04L 67/125
  701/1

(Continued)

FOREIGN PATENT DOCUMENTS

| | | |
|---|---|---|
| DE | 10 2011 112 628 A1 | 6/2012 |
| WO | WO 2008/070093 A1 | 6/2008 |

OTHER PUBLICATIONS

German-language Search Report issued in counterpart German Application No. 10 2015 204 203.0 dated Nov. 25, 2016 with partial English translation (13 pages).

(Continued)

*Primary Examiner* — Beau D Spratt
(74) *Attorney, Agent, or Firm* — Crowell & Moring LLP

(57) ABSTRACT

An audio device for vehicles includes two audio sources; three audio sinks formed of two headphone connections and a speaker system; and a touch-sensitive display. The audio device is configured to simultaneously play back the two audio sources; display one representation each for the audio sources and the audio sinks on the display; and detect a touch input, wherein the touch input includes a motion of a finger of the user on the display. The motion begins on the representation of an origin audio source and proceeds toward a destination audio sink. In response to the detection, the origin audio source is output on the destination audio sink.

7 Claims, 1 Drawing Sheet

(52) U.S. Cl.
    CPC ........... *G06F 3/04817* (2013.01); *H04R 5/04* (2013.01); *H04R 2499/13* (2013.01)

(56) References Cited

U.S. PATENT DOCUMENTS

| | | | |
|---|---|---|---|
| 9,348,492 B1* | 5/2016 | Penilla | .................. B60W 40/08 |
| 9,536,197 B1* | 1/2017 | Penilla | ................ G06F 3/04817 |
| 2002/0196134 A1* | 12/2002 | Lutter | ...................... H04R 5/04 340/426.1 |
| 2006/0262935 A1* | 11/2006 | Goose | ..................... H04S 3/002 381/17 |
| 2009/0003620 A1 | 1/2009 | McKillop et al. | |
| 2009/0154713 A1* | 6/2009 | Kamiya | .................. H04S 7/302 381/1 |
| 2013/0080955 A1* | 3/2013 | Reimann | ............... G06F 3/0486 715/769 |
| 2013/0241720 A1* | 9/2013 | Ricci | ..................... G06F 3/0486 340/425.5 |
| 2015/0271561 A1* | 9/2015 | Park | ................... H04N 21/4126 725/59 |
| 2016/0246436 A1* | 8/2016 | Wild | ...................... G06F 3/0416 |

OTHER PUBLICATIONS

International Search Report (PCT/ISA/210) issued in PCT Application No. PCT/EP2016/053775 dated May 3, 2016 with English translation (7 pages).
German-language Written Opinion (PCT/ISA/237) issued in PCT Application No. PCT/EP2016/053775 dated May 3, 2016 (6 pages).

* cited by examiner

AUDIO CONTROL IN VEHICLES

CROSS REFERENCE TO RELATED APPLICATIONS

This application is a continuation of PCT International Application No. PCT/EP2016/053775, filed Feb. 23, 2016, which claims priority under 35 U.S.C. § 119 from German Patent Application No. 10 2015 204 203.0, filed Mar. 10, 2015, the entire disclosures of which are herein expressly incorporated by reference.

BACKGROUND AND SUMMARY OF THE INVENTION

The invention relates to an audio device for vehicles as well as to a vehicle having a corresponding audio device.

Nowadays, vehicles are known which have a rear seat entertainment system which enables passengers on the rear seat bench to hear music, view television or films, or play computer games. The rear seat entertainment typically offers two separate systems for the passenger on the left and on the right. These systems each have separate sources and separate output channels, including two video outputs (displays, such as LCD, LED or OLED displays) as well as two audio outputs. In this case, the audio output of the rear seat entertainment system is typically carried out by the speaker system of the vehicle (consisting of three or more speakers) and/or headphone jacks, to which the user can connect a headphone. In addition, there are wireless headphones. Frequently, there is one headphone connection respectively for the passenger on the left and on the right on the rear seat bench. The passenger on the left and on the right are each provided with several audio sources whose playback content can be determined independently of the playback content of the other audio sources. The audio source may be music (audio books, podcasts), the sound of a film, of a television station or of a computer game. In this system, the one source (music, radio, film, TV) is typically fixedly assigned to a sink (display and headphone jack). This means, for example, that the playback of a film for the passenger on the left also takes place on the display on the left and the headphone jack on the left. However, there are cases in which another division would be desirable, for example, when the passenger on the left would like to share the extract of a radio program with all passengers of the vehicle.

It is an object of the invention to provide an easily operable user interface for the distribution of the audio output between different audio sources and audio sinks in the vehicle.

This and other objects are achieved by the device and the vehicle according to embodiments of the invention.

In the following, references are made to instances (RSE-on the left, RSE-on the right, CID-front), sources (USB, FM, music hard disk, . . . ) and sinks (headphone on the left, headphone on the right, speaker).

In a first aspect of the invention, an audio device for vehicles comprises: three parallel-playing audio sources; three audio sinks, including two headphone connections and a speaker system; and a touch-sensitive display. In this case, the audio device is equipped for implementing the following steps: Simultaneous playing-back of the three audio sources; displaying one representation respectively for the audio sources and audio sinks on the display; detecting a touch input, the touch input comprising a motion of the user's finger with respect to the display, wherein the motion starts in the representation of an origin audio source and extends in the direction of a destination audio sink. In response to the detection, an outputting of the origin audio source on the destination audio sink takes place. A touch-sensitive display is frequently also called a touch screen and has the characteristic of being able to detect the touching of the display and the location of the touching. The headphone connections have the purpose of outputting current signals that can be converted to sound by headphones. The movement of the finger on the display may also be understood to be a "swiping motion" or "swiping gesture" as is known in the state of the art.

It is therefore disclosed here to graphically display audio sources and audio sinks of the entire vehicle in one display. By intuitively "pulling" audio sources onto audio sinks (or toward audio sinks), the audio content will be played back on the desired audio sink. Thus, for example, the radio program which previously had been heard by one passenger by way of his headphone, will now be played back on the speakers of the entire vehicle. A separate controlling of the volumes is made possible. Furthermore, an overview of the momentarily playing sources and the current source-sink relationship is provided.

It may be provided that the current assignment of audio sources and audio sinks is displayed in the display by graphic connections, for example, by arrows, cable/socket illustrations or spatial proximity.

The representations of the audio sources typically include information concerning the audio content being currently played-back, particularly the album cover or pertaining images. This makes it possible for the users to rapidly detect their own audio source.

In one embodiment, in addition to the representations of the audio sinks on the display, switching surfaces for the controlling of the output volume are displayed. In this manner, the user can not only select the audio sink on the display but can also intuitively adjust the volume of the playback. In addition to the volume adjustment, a switching surface for muting can also be displayed for each audio sink.

Optionally, in addition to the representations of the audio sinks on the display, it is advantageous to display switching surfaces for controlling the playing-back audio content, particularly the piece of music or radio station. Therefore, in addition to the audio source, the playing-back audio content can also intuitively be selected. This controlling of the audio content is used for a "skip" to the next title or radio station within a preselected group of titles or stations.

Another aspect of the invention relates to a vehicle having two rows of seats arranged one behind another and having the above-described audio device, the display being arranged on the back side of the first row of seats. This is therefore a rear seat entertainment system in a vehicle.

Other objects, advantages and novel features of the present invention will become apparent from the following detailed description of one or more preferred embodiments when considered in conjunction with the accompanying drawings.

BRIEF DESCRIPTION OF THE DRAWINGS

Identical reference symbols relate to corresponding elements covering all figures.

DETAILED DESCRIPTION OF THE DRAWINGS

Figure 1:
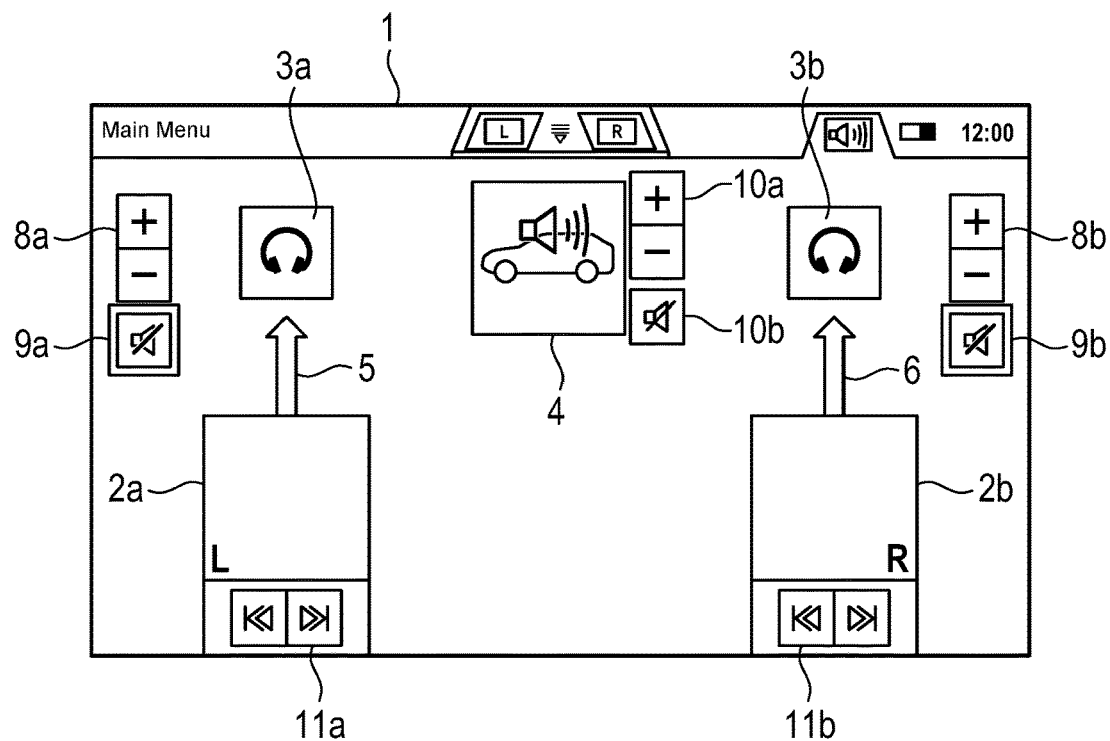
FIG. 1 is a schematic view of the display of an audio device according to an embodiment of the invention in a first condition.
Figure 2:
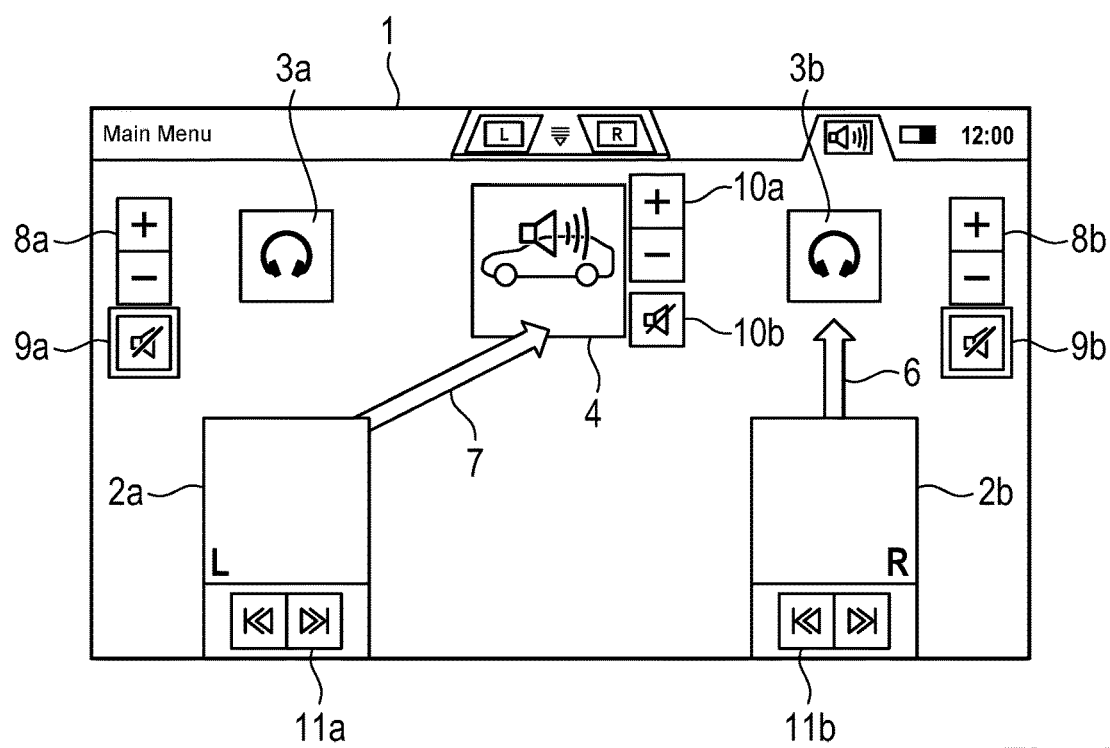
FIG. 2 is a schematic view of the display of the audio device according to the embodiment of the invention in a second condition.

FIG. 1 is a schematic view of the display 1 of an audio device according to an embodiment in a first condition. The audio device is installed in a vehicle (not shown) and includes a speaker system that is distributed in the vehicle, and two headphones or headphone jacks, one respectively for the passenger on the left and on the right on the rear seat bench. The display 1 is designed as a touch screen and can therefore detect when a finger touches the screen. In the condition illustrated in FIGS. 1 and 2, the passenger on the left had selected a first album for the music playback. The cover of this album is displayed in the display as representation 2a of the audio source. The music album selected by the passenger on the right is displayed as representation 2b of the second audio source in the display. Two switching surfaces 11a and 11b respectively for the title selection within the album are displayed below the representations 2a and 2b.

Furthermore, the display 1 shows the audio sinks, specifically the headphone jack 3a on the left, the headphone or headphone jack 3b on the right and the vehicle speaker system 4. Beside each of these sinks, switching surfaces 8a, 8b and 10a for the volume control are displayed. Likewise, switching surfaces 9a, 9b and 10b for highlighting muting of the respective audio sink are displayed.

In the condition illustrated in FIG. 1, the playback of the audio source assigned to the passenger on the left is assigned to the headphone jack on the left, which is illustrated by the graphic arrow 5. Simultaneously, the headphone or the headphone jack is muted, which is symbolized by the highlighting of the switching surface 9a.

In the display 1, the arrows 5 and 6 show the actual assignment of audio sources and audio sinks.

During operation, the passenger on the left (although the passenger on the right could also carry out this function) would like to initiate the playback of the audio source on the left on the vehicle speaker system. For this purpose, the user touches the representation 2a or 5 with his finger on the display and moves ("swipes") the finger in the direction of the representation 4 of the vehicle speaker system. This is detected by the audio device and the audio output of the audio source on the left is started on the vehicle speaker system. This new assignment is indicated by the change of the assignment arrow. The new arrow 7 (see FIG. 2) now indicates that the audio source on the left is played back on the speaker system of the vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An audio device for a vehicle having a speaker system and at least two headphone connections of respective passenger seats, comprising:
    at least two audio sources, each independently providing audio content;
    at least three audio sinks, wherein two of the audio sinks comprise the headphone connections of the respective passenger seats, and wherein one of the audio sinks comprises the speaker system;
    a touch-sensitive display that simultaneously displays audio source and audio sink icons respectively corresponding to each of the audio sources and audio sinks, including:
        a first audio source icon corresponding to a first audio source currently selected by a user for audio playback on a first audio sink of the at least three audio sinks,
        a second audio source icon corresponding to a second audio source currently selected by the user for audio playback on a second audio sink of the at least three audio sinks, and
        graphic connectors visually connecting the audio source icons to the audio sink icons at respective ends thereof, so as to indicate which of the audio sources are currently selected for audio playback on which of the audio sinks;
    wherein the audio device is configured to:
        simultaneously output as audio playback the audio content of the at least two audio sources,
        detect a touch input, wherein the touch input comprises a swiping motion of the user's finger on the display, starting on the first audio source icon and extending in the direction of a third audio sink icon corresponding to a third audio sink of the at least three audio sinks, and
        in response to detecting the touch input, output the audio content of the first audio source to the third audio sink, and display a corresponding graphic connector.

2. The audio device according to claim 1, wherein the audio source icons comprise information concerning the currently playing-back audio content.

3. The audio device according to claim 1, wherein, beside the audio sink icons in the display, switching surfaces for controlling output volume are displayed.

4. The audio device according to claim 1, wherein, beside the audio sink icons in display, switching surfaces for controlling the played-back audio content are displayed.

5. The audio device according to claim 2, wherein the information concerning the currently playing-back audio content is an album cover or images pertaining to the currently playing-back audio content.

6. The audio device according to claim 4, wherein the played-back audio content is a piece of music or a radio station.

7. A vehicle, comprising:
    a speaker system;
    a first row of seats and a second row of seats arranged one behind the other, the second row of seats including passenger seats having respective headphone connections;
    an audio device, comprising:
        at least two audio sources, each independently providing audio content;
        at least three audio sinks, wherein two of the audio sinks comprise the headphone connections of the respective passenger seats, and wherein one of the audio sinks comprises a speaker system;
        a touch-sensitive display, arranged on a backside of a front one of the first and second rows of seats, that simultaneously displays audio source and audio sink icons respectively corresponding to each of the audio sources and audio sinks, including:

a first audio source icon corresponding to a first audio source currently selected by a user for audio playback on a first audio sink of the at least three audio sinks, a second audio source icon corresponding to a second audio source currently selected by the user for audio playback on a second audio sink of the at least three audio sinks, and graphic connectors visually connecting the audio source icons to the audio sink icons at respective ends thereof, so as to indicate which of the audio sources are currently selected for audio playback on which of the audio sinks;

wherein the audio device is configured to:

simultaneously output as audio playback the audio content of the at least two audio sources, detect a touch input, wherein the touch input comprises a swiping motion of the user's finger on the display, starting on the first origin audio source icon and extending in the direction of a third audio sink icon corresponding to a third audio sink of the at least three audio sinks, and in response to detecting the touch input, output the audio content of the first audio source to the third audio sink, and display a corresponding graphic connector.

\* \* \* \* \*